United States Patent [19]
Shotéy et al.

[11] Patent Number: 5,965,846
[45] Date of Patent: Oct. 12, 1999

[54] RECEPTACLE-MOUNTED COVER PLATE TO HIDE ELECTRICAL SOCKET FACE

[75] Inventors: Michael Shotéy, Scottsdale; Edgar W. Maltby, Mesa, both of Ariz.

[73] Assignee: TayMac Corporation, Tempe, Ariz.

[21] Appl. No.: 08/775,382

[22] Filed: Dec. 30, 1996

Related U.S. Application Data

[63] Continuation of application No. 08/310,284, Sep. 21, 1994, abandoned.

[51] Int. Cl.⁶ .................................................. H02G 3/14
[52] U.S. Cl. ............................................ 174/66; 220/241
[58] Field of Search ........................ 174/66, 67; 220/241, 220/242; D8/350, 351, 352, 353; D13/143, 137

[56] References Cited

U.S. PATENT DOCUMENTS

| | | |
|---|---|---|
| D. 75,096 | 5/1928 | Both . |
| D. 150,242 | 7/1948 | McDonald ........................... D8/353 X |
| D. 159,413 | 7/1950 | Hayman .................................. D8/353 |
| D. 184,263 | 1/1959 | McCarthy ................................ D8/353 |
| D. 208,025 | 7/1967 | Weitzman ................................ D8/353 |
| 1,697,348 | 1/1929 | Cunningham . |
| 1,726,429 | 8/1929 | Ferris ........................................ 174/66 |
| 1,784,277 | 12/1930 | Darlington ............................... 220/241 |
| 1,785,463 | 12/1930 | Strongson ................................ 439/536 |
| 1,926,001 | 9/1933 | Goodridge ............................ 174/66 X |
| 2,528,014 | 10/1950 | Moses, Jr. et al. .................... 174/67 X |
| 3,363,216 | 1/1968 | Benedetto .................................. 339/39 |
| 3,386,071 | 5/1968 | Allen ..................................... D8/350 X |
| 3,437,737 | 4/1969 | Wagner ................................. 174/66 X |
| 3,518,356 | 6/1970 | Friedman .................................. 174/66 |
| 3,840,692 | 10/1974 | Wells ........................................ 174/66 |
| 3,928,716 | 12/1975 | Marrero .................................... 174/53 |
| 4,163,137 | 7/1979 | Close, Jr. ................................. 200/302 |
| 4,312,458 | 1/1982 | Stewart .................................... 220/241 |
| 4,774,641 | 9/1988 | Rice .......................................... 362/95 |
| 4,952,755 | 8/1990 | Engel et al. ............................. 174/67 |
| 4,970,349 | 11/1990 | Jones ......................................... 174/67 |
| 5,003,128 | 3/1991 | Grondin ................................... 174/67 |
| 5,017,153 | 5/1991 | Bowman ................................ 439/426 |
| 5,165,042 | 11/1992 | Klinger .................................... 174/67 |
| 5,180,886 | 1/1993 | Dierenbach .............................. 174/66 |
| 5,240,426 | 8/1993 | Barla ....................................... 439/136 |
| 5,285,014 | 2/1994 | Gilchrist ................................... 174/67 |
| 5,342,995 | 8/1994 | Comerci .................................... 174/67 |

FOREIGN PATENT DOCUMENTS

| | | | |
|---|---|---|---|
| 208773 | 2/1956 | Australia ............................. 174/66 X |

*Primary Examiner*—Dean A. Reichard
*Attorney, Agent, or Firm*—Stephen T. Sullivan

[57] ABSTRACT

An easily-installed cover plate for hiding the faces of sockets by covering an electrical outlet, including the faces of the sockets. The cover plate is mounted over the receptacle and has apertures for plug blades. In the preferred embodiment, the cover plate is rectangularly shaped to cover a duplex receptacle, having apertures to receive plug blades and a center hole for receiving a screw which secures the cover plate over the duplex receptacle.

22 Claims, 2 Drawing Sheets

RECEPTACLE-MOUNTED COVER PLATE TO HIDE ELECTRICAL SOCKET FACE

This application is a continuation of Ser. No. 08/310,284, filed Sep. 21, 1994, now abandoned.

BACKGROUND OF THE INVENTION

This invention relates generally to cover plates for electrical outlets and more particularly to a simplified means to cover the face of unattractive electrical sockets and thereby make the outlet more aesthetically pleasing.

Conventional electrical outlets are made of several components, including a wall box and a receptacle, which is typically composed of pairs of sockets and a yoke. The receptacle is typically attached to the wall box that is typically attached to a framing member inside the wall, and is accessible through a hole cut in the wall. A cover plate having apertures to allow the sockets to protrude is installed over these components, typically with one or two screws. Electrical devices are plugged in by inserting the plug blades through aligned apertures in the cover plate and socket.

A cover plate is installed after construction. It is common practice to remove the cover plate during remodeling or redecorating so that it does not become damaged or defaced with paint drips and splatters, wallpaper paste, or other decorating materials. The conventional cover plate is easily removed by unscrewing the screw or screws that attach it directly to the receptacle. However, the receptacle is not usually removed during remodeling or redecorating because it is hard-wired into the building's electrical system. Consequently, the receptacle and sockets are left exposed and the faces of the sockets become covered with paint splatters and the like. If not cleaned immediately, the face may become permanently defaced, thereby making the electrical outlet more unsightly and conspicuous. Repeated paintings only make the problem worse. Reinstalling the cover plate then emphasizes the paint-splattered surface of the outlet, as the defaced socket surface is compared to the pristine surface of the cover plate.

Cover plates are now available in a variety of colors and decorator textures to more closely go with any decor, and sometimes are even covered with wallpaper to match the wall. However, the underlying receptacles and cover plates are made in standard colors, usually beige and dark brown, and unfortunately do not match many decorative cover plates. Because most cover plates allow the face of the sockets to be exposed, such mismatched sockets and cover plates cause the outlets to be more conspicuous. It is desirable, then, to provide a cover plate that can be installed over existing receptacles that covers not only the wall box assembly, but the face of the sockets, too, in order to make the outlet less conspicuous and more attractive.

Decorative cover plates known in the art generally attempt to make outlets more attractive by attaching a new cover to existing cover plates. For example, in U.S. Pat. No. 1,784,277, issued to Darlington, describes an ornamental cover for a light switch manufacturable in many colors. The cover is a multilayer pad of adhesively-backed sheets which is adhesively attached to the existing cover plate. When desired, a decorative sheet may be removed, exposing a new sheet. In U.S. Pat. No. 4,312,458, issued to Stewart, describes a fabric slipcover for an existing cover plate. In U.S. Pat. No. 3,840,692, issued to Wells, describes an outsized cover plate that is screwed over an existing cover plate. Because these decorative cover plates overlay the existing cover plate, these inventions result in a cover that projects farther from the wall than the original cover plate, thereby making the outlet even more noticeable.

More complex devices have been invented to achieve an aesthetically pleasing electrical outlet. For example U.S. Pat. No. 5,180,886 issued to Dierenbach, describes an entire wall box assembly to provide an attractive designer-style appearance. The decorative appearance is achieved with the use of a multi-component cover plate requiring a plurality of attachment means to secure the components in place.

The prior art also describes removable paint shields to protect the sockets and cover plates during painting. In U.S. Pat. No. 5,003,128, issued to Grondin describes a cover that removably adheres to an existing cover plate of an electrical outlet so that the electrical elements are protected during painting. The device completely covers the receptacles such that a plug may not be inserted. Gilchrist describes a paint shield in U.S. Pat. No. 5,285,014 that also covers all exposed surfaces of an electrical outlet. The shield is temporarily attached using suction or adhesives, or with prongs that fit snugly in the socket apertures. While these devices do protect the outlets if installed before painting, they do not remedy the situation where the sockets are already defaced. Similarly, these covers do not make a mismatched outlet match a new decor, and therefore do not provide a means for making the outlets more attractive.

Other patents describe inventions that replace existing cover plates to improve safety of the outlet. In U.S. Pat. No. 5,165,042, issued to Klinger describes a decorative safety cover plate that replaces the existing plate. This invention comprises a base plate and a decorative face plate that slides between a closed position where the sockets are occluded, and an open position where the sockets are exposed. Barla describes a safety cover plate in U.S. Pat. No. 5,240,426 that replaces the existing cover plate. The plate has manually positionable shutters to occlude the entire socket so that plugs may not be inserted. While improving safety, these devices are multi-component parts that are relatively expensive, more difficult to install, and prone to breaking. They also suffer the same problem as the known decorative cover plates, i.e., they project farther from the wall than the original cover plate, thereby making the outlet even more noticeable.

The problem of defacing electrical receptacles during painting is age-old, the prior art showing remedies attempting a simpler means to cover the face of unattractive electrical sockets and thereby make the outlet less conspicuous dating back to the early 1900's. Nevertheless, a simple, easily installed, inexpensive cover plate to make existing outlets more attractive has evaded invention. There has existed a long-felt need for a simple, inexpensive way to make electrical outlets more attractive, without having to resort to replacing the receptacle or entire wall box assembly, or making the outlet project even farther from the wall.

The primary objective of this invention is to provide a simplified means to cover the face of unattractive electrical sockets and thereby make the outlet less noticeable. This objective is achieved with the several embodiments described below and in the accompanying claims and drawings. Variations and modifications which are in the spirit of this invention and known to those skilled in the art are considered to fall within the scope of this invention.

BRIEF SUMMARY OF THE INVENTION

This invention provides a simple, easily-installed cover plate that hides the face of sockets by covering an electrical outlet, including the face of the sockets. The cover plate is mounted over the receptacle and has apertures for plug blades. Several embodiments of the present invention are presented to achieve these objectives. In the preferred embodiment, the cover plate is rectangularly shaped to cover a duplex receptacle, having apertures to receive plug blades and a center hole for receiving a screw which secures the cover plate over the duplex receptacle.

DESCRIPTION OF THE SEVERAL EMBODIMENTS

Figure 1:
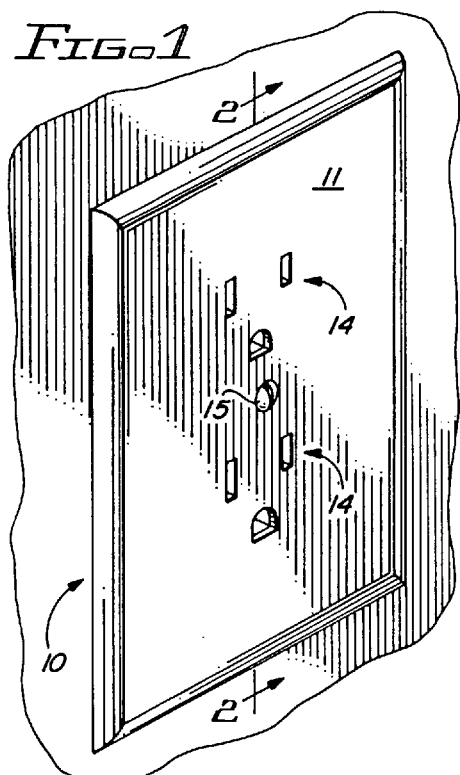
FIG. 1 is a perspective view of the cover plate installed over an existing receptacle.
Figure 2:
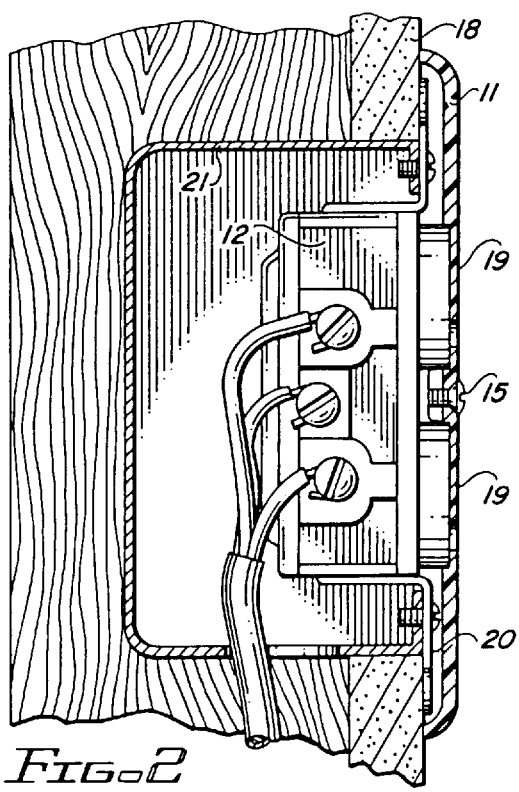
FIG. 2 is a cross-sectional view taken along the line 2—2 of FIG. 1.
Figure 3:
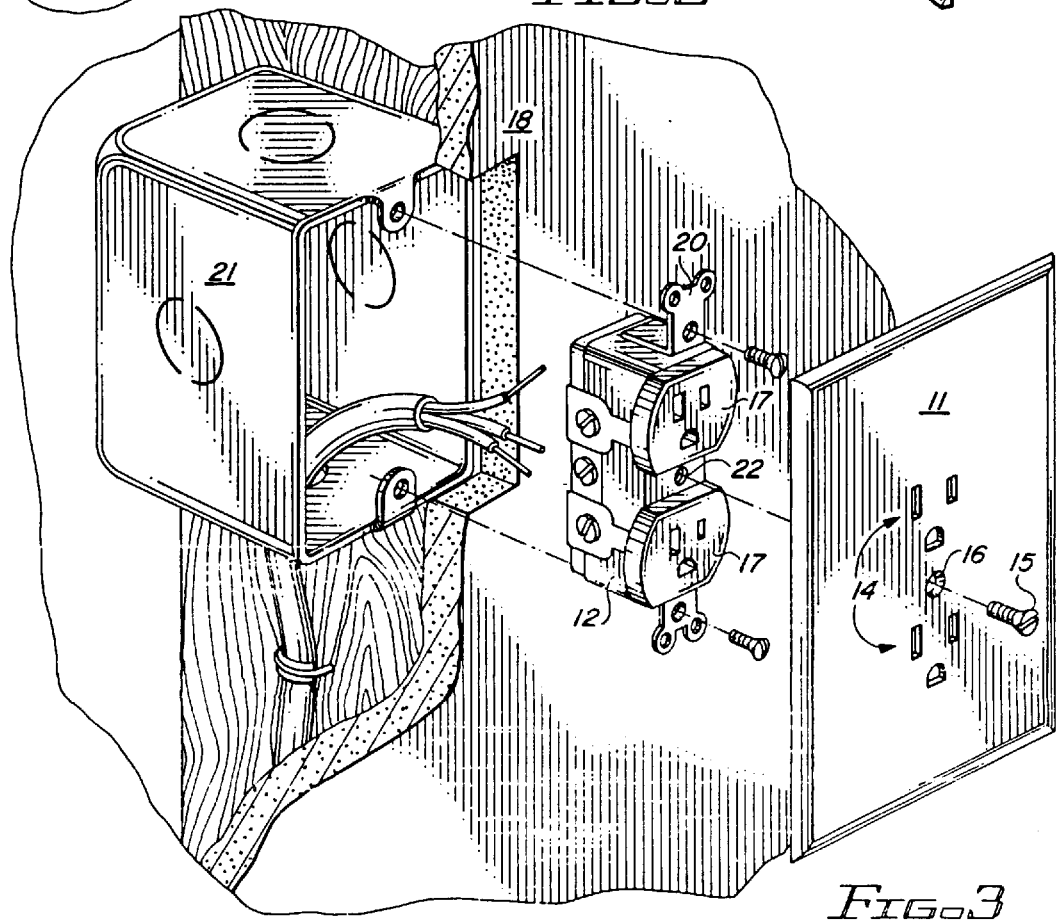
FIG. 3 is an exploded view of the cover plate installed over an existing receptacle.

Referring to FIGS. 1–3, where like indicia refer to like parts, the preferred embodiment of the invention, denoted generally as 10, is illustrated as installed over an existing receptacle 12. The cover plate 11 has a set of apertures 14 for plug blades. A screw 15 is inserted through another aperture 16 to secure the cover plate 11 over the existing receptacle 12.

In conventional outlets, the sockets 17 extend beyond the plane of the wall 18 through apertures in the conventional cover plate (not shown). Ideally, the cover plate and the face of the sockets are flush, which necessitates that the conventional cover plate project approximately 0.20–0.25 inches from the wall. In the present invention, the cover plate 11 is specifically designed to cover the face of the receptacle 12 and its sockets 17, so there are no apertures for the sockets. Instead, the cover plate 11 is adapted to receive the face of the socket 17 against the back side of the cover plate 11, e.g., as shown in FIG. 2. While the front of the cover plate 11 has a uniform topography, in this example smooth, in the preferred embodiment the back side of the cover plate 11 has depressed, thinned areas 19 defining receiving areas for the faces of the sockets 17. By fitting the faces of the sockets into these thinned areas when the cover plate 11 is installed, the cover plate 11 of the present invention projects beyond the plane of the wall approximately the same distance as a conventional cover plate. Preferably the thinned areas 19 are sufficiently large for easy installation over any socket face.

While the shape of the thinned areas need not coincide with the shape of the socket, the thinned areas can be manufactured to precisely match the shape of the socket. The cover plate is stronger and more durable with smaller thinned areas, however. With the more durable embodiment of the cover plate, the cover plate can also protect the receptacle from damage due to rough handling. For example, if a plug inserted into an outlet with a conventional cover plate is yanked out of the wall sideways, that is, substantially parallel to the wall, the forces applied to the sockets can cause the receptacle to be jarred loose or to crack. A cover plate of the present invention can help protect the receptacle because as the plug is pulled sideways from an outlet having the present cover plate, the applied forces act on the present cover plate, reducing or eliminating the forces on the receptacle.

Referring now to FIG. 3, it shows an exploded view of the preferred embodiment cover plate 11 installed over an existing receptacle illustrating the cover plate 11, receptacle 12, sockets 17, yoke 20, wall box 21, and wall 18. The cover plate 11 is secured over the receptacle 12 by inserting a screw 15 through at least one securing aperture 16 into aligned, mated, threaded receiving apertures 22 in the receptacle 12 or yoke 20. This is but one example of a conventional receptacle having a threaded receiving aperture centered between the sockets for receiving a screw. Other conventional receptacles may have a pair of receiving apertures placed at opposite ends of the receptacle in the yoke. The present invention may be made to accommodate any underlying receptacle, although only the preferred embodiment is shown in the figures. If necessary to strengthen the cover plate's securing aperture 16, a flange may surround the securing aperture, projecting outwardly from the reverse side of the cover plate.

Figure 4:
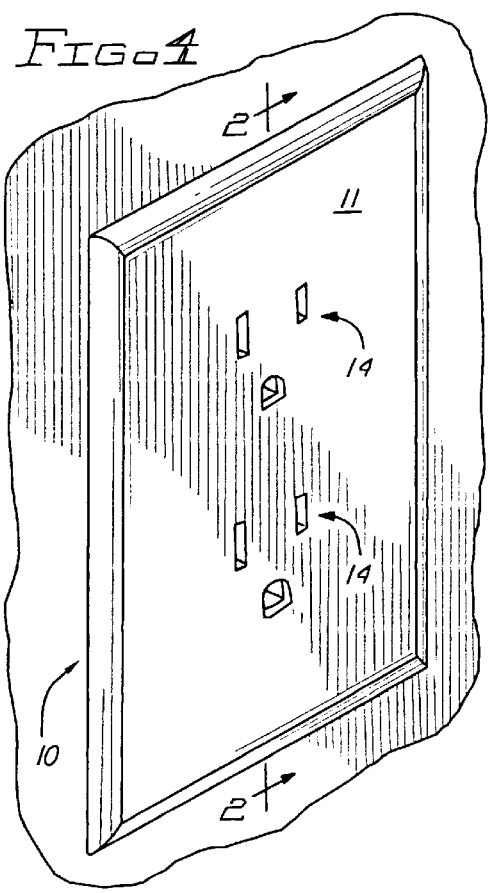
FIG. 4 is a perspective view of a cover plate according to another preferred embodiment of the invention.
Figure 5:
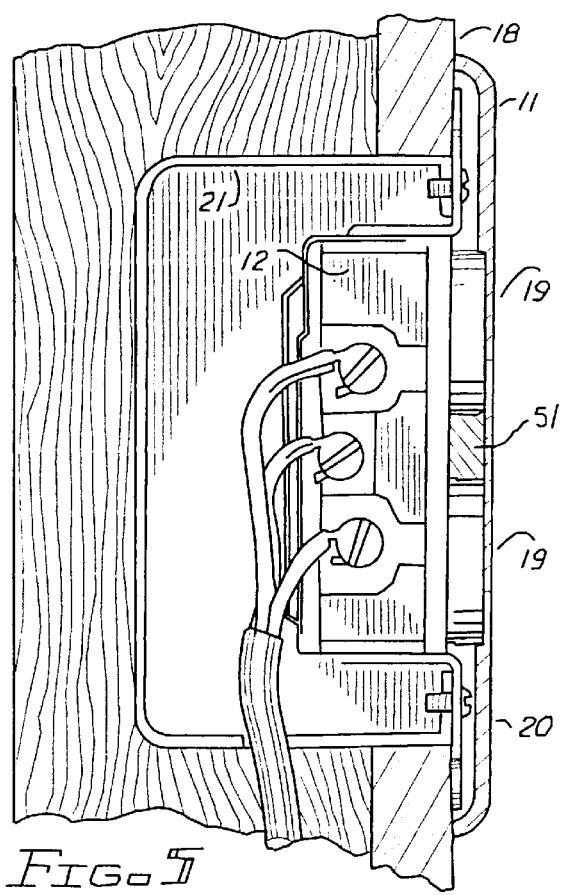
FIG. 5 is a cross-sectional view taken along line 2—2 of FIG. 4.

Alternative means may be used for securing the cover plate 11 over the receptacle. In particular, a pin may be inserted through at least one securing aperture into an aligned, mated receiving aperture or apertures in the receptacle or yoke. If securing apertures are not desired, the cover plate may be adhesively attached over the receptacle or yoke. FIGS. 4 and 5 show a cover plate according to a second preferred embodiment of the invention, wherein securing apertures are not provided, but wherein the cover plate is attached to the yoke by a double-sided adhesive tape 51. Furthermore, the cover plate may be snapped onto the receptacle by fitting the sockets snugly into the depressed, thinned areas that have been manufactured to precisely match the shape of the socket.

The number of apertures in the cover plate for receiving plug blades is dependent on the number of blades on the plug. Typically, the number and position of apertures on the cover plate will match the number and position of apertures on the receptacles, although fewer apertures may be used on the cover plate to occlude apertures in the sockets, if desired. Conventional dual receptacle outlets have two sets of apertures, one set for each socket. In addition to outlets having different number of apertures, outlets may have varying numbers of sockets. For example, conventional outlets have two sockets and are known as one-gang outlets as shown in FIGS. 1–3. Two-gang outlets are also common. The cover plate of the present invention can be made with corresponding number and placement of apertures to match and align with the number of underlying sockets.

The cover plates of the present invention typically have outside dimensions that substantially match a conventional or existing cover plate, but the cover plates herein described may be designed in any desired size and shape to enhance the appearance of the electrical outlet.

We claim:

1. A cover plate for covering an electrical outlet, the electrical outlet including a receptacle having at least one socket and at least one securing aperture for receiving a securing device, each of the at least one socket including a face and a plurality of blade apertures for receiving plug blades, the cover plate comprising:

a front surface for facing outwardly from the electrical outlet and externally relative to the cover plate and a back surface for facing toward the electrical outlet;

a plurality of blade apertures extending through the cover plate through the front and back surfaces and positioned in the cover plate so the blade apertures are in substantial alignment with the blade apertures of the at least one socket when the cover plate is affixed to the electrical outlet for receiving the plug blades; and at least one securing aperture extending through the cover plate through the front and back surfaces and positioned in the cover plate so the at least one securing aperture is in substantial alignment with a corresponding one of the at least one securing aperture of the receptacle when the cover plate is affixed to the electrical outlet for receiving the securing device and fixedly positioning the cover plate with respect to the receptacle; and the front surface of the cover plate otherwise being continuous, having uniform topography, and being free of any other apertures;

the cover plate being a single, solid component except for the blade apertures and the at least one securing aperture.

2. The cover plate of claim 1, wherein:

the securing device of the electrical outlet receptacle comprises a screw; and the at least one securing aperture of the cover plate has a size slightly larger than the screw for receiving the screw and fixedly securing the cover plate to the receptacle.

3. The cover plate of claim 1, wherein the back surface includes at least one thinned receiving area sized to receive the at least one socket of the receptacle such that the at least one receiving area receives and mates to the at least one socket when the cover plate is affixed to the electrical outlet.

4. The cover plate of claim 1, wherein the front surface is smooth.

5. The cover plate of claim 1, wherein the receptacle has a face which includes the face of the at least one socket and the at least one securing aperture, and the front surface of the cover plate is sized to cover the entire face of the at least one socket except for the blade apertures of the at least one socket and the at least one securing aperture of the receptacle when the cover plate is affixed to the electrical outlet.

6. The cover plate of claim 1, wherein the electrical outlet is disposed in a hole, and the front surface is sized to cover the entire hole except for the blade apertures of the at least one socket and the at least one securing aperture of the receptacle when the cover plate is affixed to the electrical outlet.

7. The cover plate of claim 1, wherein the cover plate is substantially planar.

8. A cover plate for covering an electrical outlet, the electrical outlet including a receptacle having at least one socket and at least one securing aperture for receiving a securing device, each of the at least one socket including a face and a plurality of blade apertures for receiving plug blades, the cover plate comprising:

a front surface for facing outwardly from the electrical outlet and externally relative to the cover plate and a back surface for facing toward the electrical outlet;

at least one securing aperture extending through the cover plate through the front and back surfaces and positioned in the cover plate so the at least one securing aperture is in substantial alignment with a corresponding one of the at least one securing aperture of the receptacle when the cover plate is affixed to the electrical outlet for receiving the securing device and fixedly positioning the cover plate with respect to the receptacle; and a plurality of blade apertures extending through the cover plate through the front and back surfaces and positioned in the cover plate so the blade apertures are in substantial alignment with the blade apertures of the at least one socket when the cover plate is affixed to the electrical outlet for receiving the plug blades;

the back surface having at least one thinned receiving area approximately the same size as the face of the at least one socket sized to receive, contact, to be substantially flush with, and to mate with the face of the at least one socket of the receptacle when the cover plate is affixed to the electrical outlet; and the front surface of the cover plate otherwise being continuous, having uniform topography, and being free of any other apertures.

9. The cover plate of claim 8, wherein the front surface is smooth.

10. The cover plate of claim 8, wherein the receptacle has a face which includes the face of the at least one socket and the at least one securing aperture, and the front surface of the cover plate is sized to cover the entire face of the at least one socket except for the blade apertures of the at least one socket when the cover plate is affixed to the electrical outlet.

11. The cover plate of claim 8, wherein the electrical outlet is disposed in a hole, and the front surface is sized to cover the entire hole except for the blade apertures of the at least one socket and the at least one securing aperture of the receptacle when the cover plate is affixed to the electrical outlet.

12. The cover plate of claim 8, wherein the cover plate is substantially planar.

13. The cover plate of claim 8, wherein the cover plate is a single, solid component except for the blade apertures and the at least one securing aperture.

14. A cover plate for covering an electrical outlet, the electrical outlet including a receptacle having at least one socket, each of the at least one socket including a face and a plurality of blade apertures for receiving plug blades, the cover plate comprising:

a front surface for facing outwardly from the electrical outlet and externally relative to the cover plate and a back surface for facing toward the electrical outlet;

a plurality of blade apertures extending through the cover plate through the front and back surfaces and positioned in the cover plate so the blade apertures are in substantial alignment with the blade apertures of the at least one socket when the cover plate is affixed to the electrical outlet for receiving the plug blades;

the front surface otherwise being continuous, having uniform topography, and being free of any other apertures; and a portion of the back surface being shaped to directly contact and to be substantially flush with the face of the at least one socket when the cover plate is affixed to the electrical outlet.

15. The cover plate of claim 14, wherein the front surface is smooth.

16. The cover plate of claim 14, wherein the receptacle has a face which includes the face of the at least one socket and the at least one securing aperture, and the front surface of the cover plate is sized to cover the entire face of the at least one socket when the cover plate is affixed to the electrical outlet.

17. The cover plate of claim 14, wherein the electrical outlet is disposed in a hole, and the front surface is sized to cover the entire hole except for the blade apertures of the at least one socket when the cover plate is affixed to the electrical outlet.

18. The cover plate of claim 14, wherein the cover plate is substantially planar.

19. The cover plate of claim 14, wherein the cover plate is a single, solid component except for the blade apertures.

20. A cover plate for covering an electrical outlet, the electrical outlet including a receptacle having at least one socket and at least one securing aperture for receiving a securing device, each of the at least one socket including a face and a plurality of blade apertures for receiving plug blades, the cover plate comprising:

- a front surface for facing outwardly from the electrical outlet and externally relative to the cover plate and a back surface for facing toward the electrical outlet;
- a plurality of blade apertures extending through the cover plate through the front and back surfaces and positioned in the cover plate so the blade apertures are in substantial alignment with the blade apertures of the at least one socket when the cover plate is affixed to the electrical outlet for receiving the plug blades; and
- at least one securing aperture extending through the cover plate through the front and back surfaces and positioned in the cover plate so the at least one securing aperture is in substantial alignment with a corresponding one of the at least one securing aperture of the receptacle when the cover plate is affixed to the electrical outlet for receiving the securing device and fixedly positioning the cover plate with respect to the receptacle;
- the front surface of the cover plate otherwise being continuous, having uniform topography, and being free of any other apertures; and
- a portion of the back surface of the cover plate being shaped to directly contact and be substantially flush with the face of the at least one socket when the cover plate is affixed to the electrical outlet.

21. The cover plate of claim 20, wherein the front surface is smooth.

22. The cover plate of claim 20, wherein the back surface includes at least one thinned receiving area sized to receive the at least one socket of the receptacle such that the at least one receiving area receives and mates to the at least one socket when the cover plate is affixed to the electrical outlet.

* * * * *